United States Patent
Noguchi (10) Patent No.: US 9,360,373 B2
(45) Date of Patent: Jun. 7, 2016

(54) INFRARED SENSOR OF REAR SURFACE IRRADIATION TYPE

(71) Applicant: Hidetaka Noguchi, Hyogo (JP)

(72) Inventor: Hidetaka Noguchi, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 171 days.

(21) Appl. No.: 14/153,588

(22) Filed: Jan. 13, 2014

(65) Prior Publication Data

US 2014/0264022 A1    Sep. 18, 2014

(30) Foreign Application Priority Data

Mar. 12, 2013   (JP) .................. 2013-049223

(51) Int. Cl.
*G01J 5/02* (2006.01)
*G01J 5/10* (2006.01)
*G01J 5/12* (2006.01)

(52) U.S. Cl.
CPC .................. *G01J 5/02* (2013.01); *G01J 5/0225* (2013.01); *G01J 5/10* (2013.01); *G01J 5/12* (2013.01)

(58) Field of Classification Search
CPC ............. G01J 5/02; G01J 5/12; G01J 5/0225; G01J 5/10; H01L 27/144
USPC ..................................................... 250/338.1
See application file for complete search history.

(56) References Cited

U.S. PATENT DOCUMENTS

| | | | |
|---|---|---|---|
| 6,372,656 B1 | 4/2002 | Laermer et al. | |
| 6,717,228 B2 | 4/2004 | Ando et al. | |
| 7,871,073 B2 | 1/2011 | Noguchi et al. | |
| 7,971,878 B2 | 7/2011 | Hashimoto et al. | |
| 8,010,027 B2 | 8/2011 | Hodoshima et al. | |
| 8,087,670 B2 | 1/2012 | Noguchi et al. | |
| 8,126,387 B2 | 2/2012 | Noguchi et al. | |
| 8,131,173 B2 | 3/2012 | Noguchi et al. | |
| 8,165,498 B2 | 4/2012 | Hoshino et al. | |
| 8,254,811 B2 | 8/2012 | Andoh et al. | |
| 8,364,071 B2 | 1/2013 | Noguchi et al. | |
| 8,385,762 B2 | 2/2013 | Noguchi et al. | |
| 8,422,037 B2 | 4/2013 | Hodoshima et al. | |
| 8,538,310 B2 | 9/2013 | Matsuda et al. | |
| 2008/0175612 A1 | 7/2008 | Oikawa et al. | |
| 2008/0210999 A1* | 9/2008 | Horikawa | 257/296 |

(Continued)

FOREIGN PATENT DOCUMENTS

| | | |
|---|---|---|
| JP | 62-281373 | 12/1987 |
| JP | 2000-114607 | 4/2000 |

(Continued)

*Primary Examiner* — Mark R Gaworecki
(74) *Attorney, Agent, or Firm* — Oblon, McClelland, Maier & Neustadt, L.L.P (57) ABSTRACT

A rear-surface-irradiation-type infrared sensor includes a substrate having a through hole passing through between an upper surface and a lower surface; an infrared absorption part on the substrate on a side of the upper surface separate from the substrate by the through hole; and a temperature sensor part detecting a change in a temperature of the infrared absorption part. The through hole includes a first through hole part having an opening on the upper surface and one or more second through hole parts having shapes different from the first through hole constituent part. The first through hole part and the second through hole part(s) communicate with each other. In a cross-sectional shape of the through hole on a plane perpendicular to the upper surface, an inside wall of the first through hole part is outside an inside wall of the of second through hole part(s).

6 Claims, 10 Drawing Sheets

(56) References Cited

U.S. PATENT DOCUMENTS

| | | | |
|---|---|---|---|
| 2010/0034234 A1* | 2/2010 | Hata et al. | 372/50.12 |
| 2011/0155913 A1 | 6/2011 | Noguchi et al. | |
| 2012/0061569 A1 | 3/2012 | Noguchi | |
| 2012/0181430 A1 | 7/2012 | Noguchi et al. | |

FOREIGN PATENT DOCUMENTS

| | | |
|---|---|---|
| JP | 2001-304973 | 10/2001 |
| JP | 2004-037297 | 2/2004 |
| JP | 2013-190239 | 9/2013 |

* cited by examiner

INFRARED SENSOR OF REAR SURFACE IRRADIATION TYPE

BACKGROUND OF THE INVENTION

1. Field of the Invention

The present invention relates to an infrared sensor of a rear surface irradiation type.

2. Description of the Related Art

Recently, uncooled thermal infrared array sensors, thermal infrared line sensors and so forth using bolometers, thermopiles, diodes and so forth have been aggressively developed (for example, see Japanese Laid-Open Patent Application No. 2000-114607).

As a thermal infrared sensor, a thermal infrared sensor of a rear surface irradiation type is known.

Figure 1A:
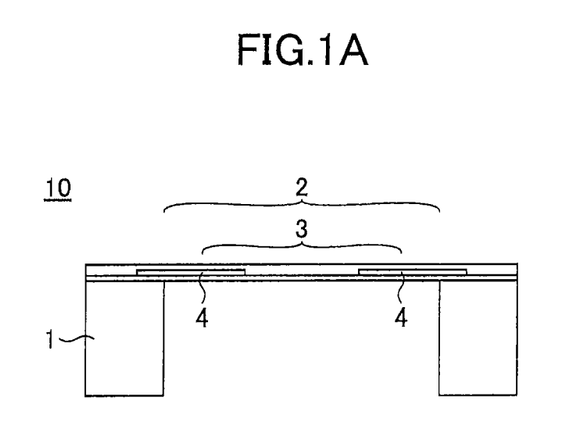
FIGS. 1A and 1B illustrate a configuration of an infrared sensor part.
Figure 1B:
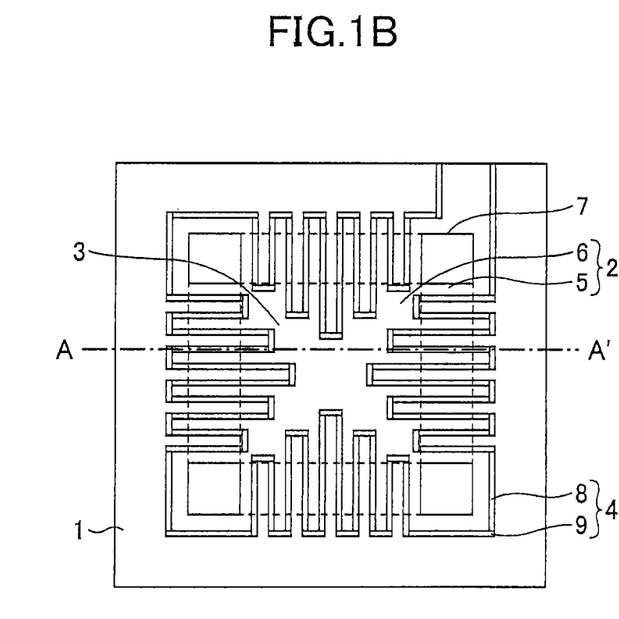

An infrared sensor part included in such a thermal infrared sensor of a rear surface irradiation type has a configuration shown in FIGS. 1A and 1B, for example. FIG. 1A shows a sectional view of the infrared sensor part 10. FIG. 1B shows a plan view of the infrared sensor part 10. FIG. 1A shows the sectional view taken along the A-A' line in FIG. 1B. Note that FIGS. 1A and 1B show the infrared sensor part 10 in a magnifying way, which is a part of an infrared sensor as shown in FIG. 2, for example.

In the infrared sensor part 10, an infrared absorption part 3 and a temperature sensor part 4 are formed on a substrate 1. The infrared absorption part 3 is a thin film made of a material that absorbs infrared rays. The temperature sensor part 4 is provided for the purpose of obtaining a change in the temperature occurring as a result of the infrared absorption part 3 absorbing infrared rays. In FIGS. 1A and 1B, an example of employing the temperature sensor part 4 of a thermopile type is shown.

The infrared absorption part 3 and the temperature sensor part 4 are formed on a heat insulated structure member 2 that is formed for the purpose of improving the heat insulation property with respect to the substrate 1 and improving the sensitivity of the infrared sensor part 10. The heat insulated structure member 2 has such a configuration that a thin film part 6 is supported to create a hollow state thereunder. For this purpose, as shown FIG. 1B, such a configuration may be provided that beam parts 5 support the thin film part 6. Openings 7 are provided at the four corners as shown in FIG. 1B, and determine the shapes of the beam parts 5 and the thin film part 6. The infrared absorption part 3 is formed integrally with the thin film part 6 of the heat insulated structure member 2. Further, a part of the substrate 1 below the heat insulated structure member 2 is removed, as shown in FIG. 1A.

Figure 2:
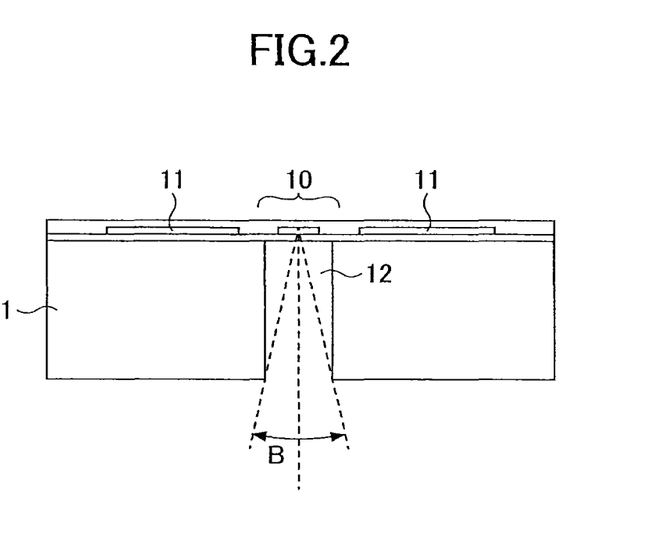
FIG. 2 illustrates a configuration of an infrared sensor in the related art.

In the infrared sensor including the above-mentioned infrared sensor part 10, the infrared sensor part 10 is formed on the substrate 1, and a peripheral circuit 11 is formed around the infrared sensor part 10 as shown in FIG. 2, for example.

Further, also as shown in FIG. 2, a through hole 12 is formed in the substrate 1 below the infrared sensor part 10 to expose the heat insulated structure member 2. Through the through hole 12, infrared rays are transmitted. Therefore, in the configuration shown in FIG. 2, the angle of field B of the infrared sensor is determined by the thickness of the substrate 1 and the opening size of the through hole 12.

SUMMARY OF THE INVENTION

An infrared sensor according to one aspect of the present invention includes a substrate in which a through hole is formed that passes through between an upper surface and a lower surface of the substrate; an infrared absorption part formed at a side of the upper surface of the substrate, and is separate from the substrate by the through hole; and a temperature sensor part that detects a change in a temperature of the infrared absorption part. The through hole includes a first through hole constituent part having an opening on the upper surface of the substrate, and one or more second through hole constituent parts having shapes different from the first through hole constituent part. The first through hole constituent part and the one or more second through hole constituent parts communicate with each other. In a cross-sectional shape of the through hole on a plane perpendicular to the upper surface of the substrate, inside walls of the one or more second through hole constituent parts are placed outside an inside wall of the first through hole constituent part.

Other objects, features and advantages of the present invention will become more apparent from the following detailed description when read in conjunction with the accompanying drawings.

DETAILED DESCRIPTION OF THE EMBODIMENTS

For the sake of convenience in explanation of the embodiments of the present invention, a problem in the above-mentioned related will be described first.

In the above-mentioned infrared sensor shown in FIG. 2, the size of the through hole 12 is restricted and thus, the field of view B in the sensor is narrow.

This is because, around the infrared sensor part 10, the peripheral circuit 11 is formed. If the through hole 12 is enlarged, a part of the substrate 1 below the peripheral circuit 11 may also be removed, and thus, the circuit characteristics may be influenced. As a method of increasing the angle of field, the thickness of the substrate 1 may be reduced. However, for this purpose, handling of the substrate 1 in the manufacturing process, or the like, may be influenced, and thus, it may be difficult to reduce the thickness of the substrate 1. Especially, further miniaturization of the infrared sensor is demanded. In order to further miniaturize the infrared sensor part 10, the aspect ratio in the through hole 12 is to be further increased, and thus, the angle of field in the sensor is to be further narrowed.

The embodiments of the present invention have been devised in consideration of the problem. An objective of the embodiments is to provide infrared sensors each having a wide angle of field without influencing circuit characteristics and without reducing a thickness of a substrate.

Below, the embodiments will be described with reference to the drawings.

[First Embodiment]

According to the first embodiment, a configuration example of an infrared sensor of a rear surface irradiation type according to the present invention will be described.

An infrared sensor according to the first embodiment is an infrared sensor of a rear surface irradiation type. Further, as shown in FIG. 3, the infrared sensor has a substrate 1 in which a through hole 12 is formed to pass through between an upper surface and a lower surface of the substrate 1; an infrared absorption part 3 (see FIGS. 1A and 1B) formed at a side of the upper surface of the substrate 1, and is separated by the through hole 12 from the substrate 1; and a temperature sensor part 4 that detects a change in a temperature of the infrared absorption part 3.

The through hole 12 is such that a first through hole constituent part 121 having an opening on the upper surface of the substrate 1 and one or more through hole constituent parts 122 having shapes different from the first through hole constituent part 121 communicate with each other. Further, in a cross-sectional shape of the through hole 12 on a plane perpendicular to the upper surface of the substrate 1, the inside walls of the one or more second through hole constituent parts 122 are placed outside the inside wall of the first through hole constituent part 121.

As for a specific configuration, description will be made using FIG. 3.

Figure 3:
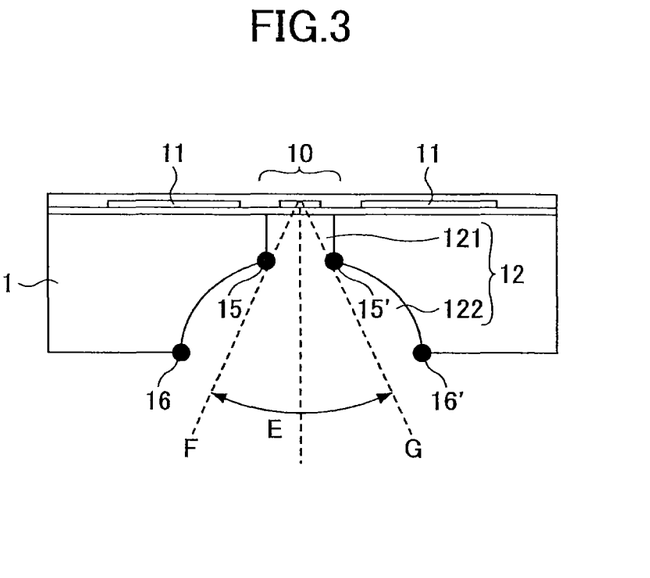
FIG. 3 illustrates an infrared sensor according to a first embodiment of the present invention.

FIG. 3 shows a sectional view of the infrared sensor according to the first embodiment taken along the plane perpendicular to the upper surface (lower surface) of the substrate 1 and passing through the through hole 12.

First, the infrared sensor according to the first embodiment is an infrared sensor of a rear surface irradiation type, and has the substrate 1 having the through hole 12 passing through between the upper surface and the lower surface of the substrate 1; the infrared sensor part 10 formed at a central part of the upper surface of the substrate 1; and a peripheral circuit 11 formed around the infrared sensor part 10.

The infrared sensor part 10 may have a configuration such that, for example, as shown in FIGS. 1A and 1B, on the substrate 1, the infrared absorption part 3 and the temperature sensor part 4 are formed.

Further, the infrared absorption part 3 is separated from the substrate 1 by the through hole 12 formed in the substrate 1. That is, it is possible that, below the infrared absorption part 3, the through hole 12 is placed so that the infrared absorption part 3 is not directly in contact with the substrate 1 (see FIG. 1A).

The infrared absorption part 3 is a thin film that is made of a material that absorbs infrared rays, and a change in the temperature occurs in the infrared absorption part 3 as a result of the infrared absorption part 3 absorbing infrared rays. However, the specific material of the infrared absorption part 3 is not particularly limited, and for example, a Si oxide film, an interlayer film, a Si nitride film or the like can be used therefor. Further, in addition, an infrared absorption film such as gold black may be formed on the side of the rear surface (on the side of the lower surface) of the infrared absorption part 3.

The temperature sensor part 4 detects a change in the temperature occurring as a result of the infrared absorption part 3 absorbing infrared rays. The temperature sensor part 4 can be one of any type as long as it can detect a change in a temperature such as thermopile, diode, bolometer, pyroelectric, or the like, and the configuration thereof is not limited. In FIGS. 1A and 1B, the thermopile temperature sensor part 4 is shown, and the temperature sensor part 4 has a configuration such that first thermopile materials 8 and second thermopile materials 9 are alternately connected. Also in a case where another type of the temperature sensor part 4 is used, it is possible to form the temperature sensor part 4 on the thin film part 6 of the heat insulated structure member 2 described below in the same way.

The infrared absorption part 3 and the temperature sensor part 4 can be formed on the heat insulated structure member 2.

The heat insulated structure member 2 is formed for improving the heat insulation property with the respect to the substrate 1 for the purpose of improving the sensitivity of the infrared sensor. A part of the substrate 1 below the heat insulated structure member 2 is removed using a method such as ICP etching. The heat insulated structure member 2 has such a configuration that the thin film part 6 integral with the infrared absorption part 3 is supported to create a hollow state thereunder, and a specific configuration is not particularly limited. For example, as shown in FIG. 1B, the beam parts 5 can be used to support the thin film part 6 to create the hollow state. The openings 7 are provided at the four corners, as shown in FIG. 1B, and determine the shapes of the beam parts 5 and the thin film part 6.

In the infrared sensor according to the first embodiment, the through hole 1 formed in the substrate 1 is configured by a combination of the first through hole constituent part 121 having the opening on the upper surface of the substrate 1 and the second through hole constituent part 122 having the shape different from the first through hole constituent part 121. That is, both through hole constituent parts 121 and 122 communicate with one another. Note that, in FIG. 3, the number of the second through hole constituent parts 122 is one. However, it is also possible that a plurality of the second through hole constituent parts 122 are included instead of the one second through hole constituent part 122.

The specific shapes of the first through hole constituent part 121 and the second through hole constituent part 122 are not particularly limited. For example, as shown in FIG. 3, in a cross-sectional shape of the first through hole constituent part 121 and the second through hole constituent part 122 on the plane perpendicular to the upper surface of the substrate 1, at least one of the first through hole constituent part 121 and the second through hole constituent part 122 has a curved surface shape. Further, it is also possible that at least another one of the first through hole constituent part 121 and the second through hole constituent part 122 has a rectangular shape.

In FIG. 3, the cross-sectional shape of the first through hole constituent part 121 is a rectangular shape, and the cross-sectional shape of the second through hole constituent part 122 is a curved surface shape. Note that one example of an actual shape of the first through hole constituent part 121 thus having the cross-sectional shape of a rectangular shape is an approximately quadrangular prism shape that has a rectangular shape in any plane perpendicular to the upper or lower surface of the substrate 1 and passing through the center of the through hole 12. One example of an actual shape of the second through hole constituent part 122 thus having the cross-sectional shape of a curved surface shape is an approximately semispherical shape or the like that has an approximately semicircular shape in any plane perpendicular to the upper or lower surface of the substrate 1 and passing through the center of the through hole 12. However, the cross-sectional shapes are not limited to those, and, as in the respective embodiments described later, the cross-sectional shapes can be various shapes.

In the cross-sectional shape of the through hole 12 as that described above, the inside wall of the second through hole constituent part 122 is placed outside the inside wall of the first through hole constituent part 121, as shown in FIG. 3.

In the case where the infrared sensor has such a configuration, the angle of field of the infrared sensor is determined by the inner ones of the straight lines connecting the lower end 15, 15' of the first through hole constituent part 121 with the infrared sensor part 10 and those connecting the lower end 16, 16' of the second through hole constituent part 122 with the infrared sensor part 10. In the case of FIG. 3, the straight lines connecting the lower end 15, 15' of the first through hole constituent part 121 with the infrared sensor part 10 are the inner ones. Therefore, the angle "E" between these straight lines "F" and "G" is the angle of field of the infrared sensor. Note that the lower end of the through hole constituent part not present on these straight lines "F" and "G" (in FIG. 3, the lower end 16, 16' of the second through hole constituent part 122) is placed outside these straight lines "F" and "G".

By forming the through hole 12 to have the above-mentioned configuration, it is possible to increase the angle of field of the infrared sensor in comparison to the related art, and freely determine the angle of field by adjusting the shape and/or the height of the first or the second through hole constituent part, while maintaining the thickness of the substrate 1 included in the infrared sensor as a whole.

Next, a manufacturing method of the through hole 12 in the infrared sensor according to the first embodiment will be described using FIGS. 4A-4E.

Figure 4A:
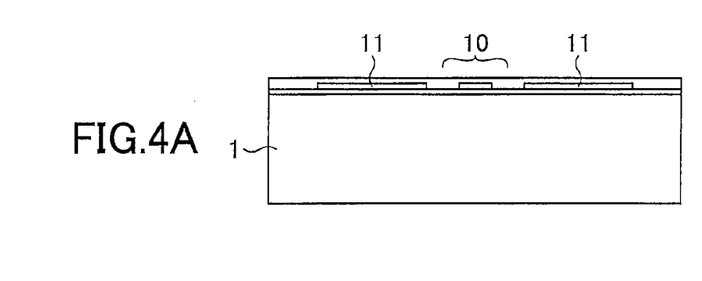
FIGS. 4A, 4B, 4C, 4D and 4E illustrate a manufacturing process of the infrared sensor according to the first embodiment.

FIG. 4A shows a state where, on the substrate 1, the infrared sensor part 10 and the peripheral circuit 11 are formed. For example, they can be formed by a semiconductor manufacturing process the same as or similar to any one of those for common IC, LSI and so forth.

Figure 4B:
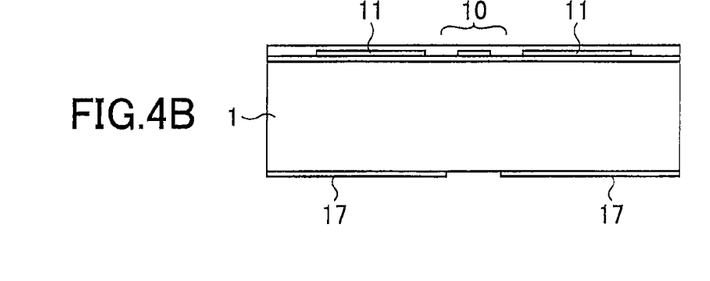

FIG. 4B shows a state where a mask 17 is formed for the purpose of forming the opening on the rear surface of the substrate 1. The material of the mask 17 is not particularly limited. For example, a material such as resist, photosensitive polyimide, a Si oxide film or a Si nitride film can be used. Note that in a case where, as mentioned above, the actual shape of the first through hole constituent part 121 is an approximately quadrangular prism shape and the actual shape of the second through hole constituent part 122 is an approximately semispherical shape, the shape of the opening formed in the mask 17 is an approximately quadrangular shape.

Figure 4C:
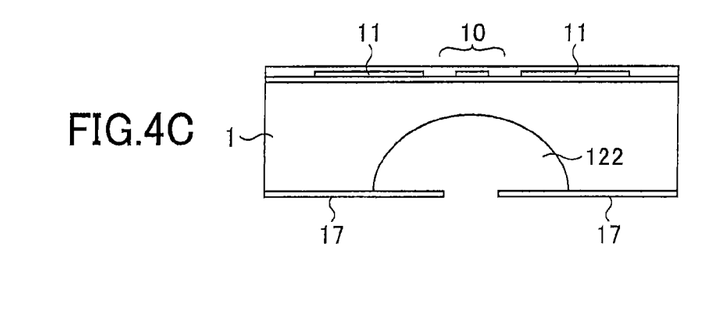

FIG. 4C shows a state where the second through hole constituent part 122 is formed using isotropic etching. As the etching gas, a gas such as a $SF_6$, $XeF_2$, or the like, can be used. In the case of using isotropic etching, the cross-sectional shape of the second through hole constituent part 122 thus formed is a curved surface shape.

Figure 4D:
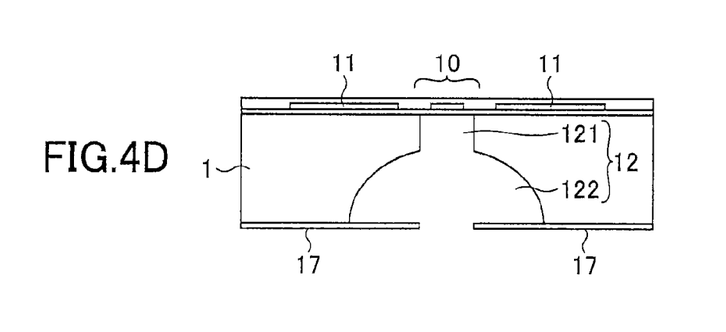

FIG. 4D shows a state where, by further carrying out anisotropic etching using the mask 17, the first through hole constituent part 121 is formed. A specific method of the anisotropic etching is not particularly limited. For example, anisotropic etching such as ICP etching or RIE can be used.

Figure 4E:
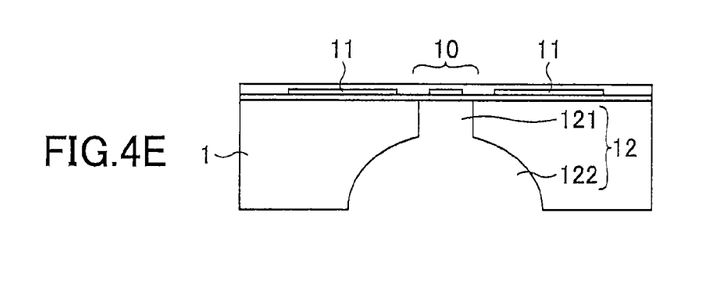

FIG. 4E shows a final shape after the mask 17 formed on the rear surface is removed. The size of the first through hole constituent part 121 is such that, as described above, the maximum diameter is determined by the size of the infrared sensor part 10. Therefore, the angle of field of the infrared sensor can be adjusted by determining the shape of the second through hole constituent part 122, that is, the depth and/or the position of the inside wall thereof, as described above using FIG. 3.

Further, as the shape of the second through hole constituent part 122, the approximately semispherical shape is shown in FIGS. 3 and 4C-4E. However, the shape of the second through hole constituent part 122 is not particularly limited thereto. As long as the positional relationship between the respective through hole constituent parts 121 and 122 shown in FIG. 3 can be obtained, the second through hole constituent part 122 can have any shape. In the method shown in FIGS. 4A-4E, the mask 17 having the same shape can be used for the two times of etching (FIGS. 4C and 4D). Thus, only one time of forming the mask 17 on the rear surface is carried out, and therefore, it is possible to simplify the manufacturing process.

Thus, the infrared sensor according to the first embodiment has been described. In the infrared sensor according to the first embodiment, it is possible to increase the angle of field of the infrared sensor in comparison to an infrared sensor of a rear surface irradiation type in the related art, without influencing the circuit characteristics and also, without reducing the thickness of the substrate.

[Second Embodiment]

In the second embodiment, another configuration example of an infrared sensor according to the present invention will be described.

Figure 5:
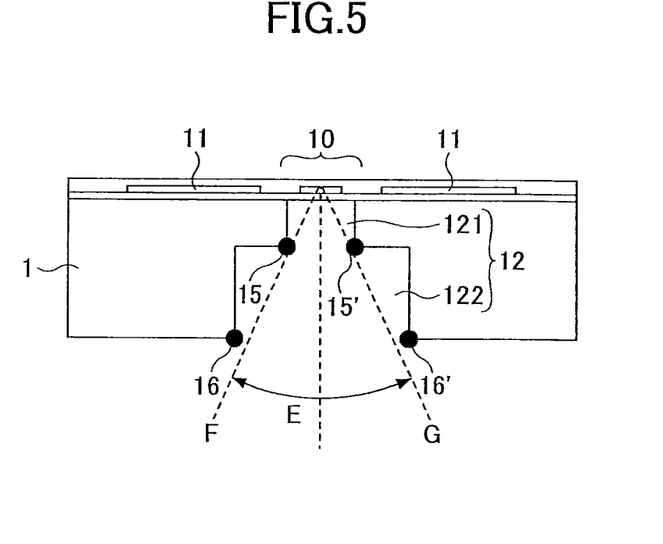
FIG. 5 illustrates an infrared sensor according to a second embodiment of the present invention.

In the infrared sensor according to the second embodiment, in a cross-sectional shape on a plane perpendicular to the upper surface of the substrate 1, the first through hole constituent part 121 and the second through hole constituent part 122 have rectangular shapes, respectively.

The specific configuration will now be described using FIG. 5.

FIG. 5 shows a sectional view taken along a plane perpendicular to the upper surface (lower surface) of the substrate 1 included in the infrared sensor according to the second embodiment and passing through the through hole 12. Note that one example of an actual shape of the first through hole constituent part 121 thus having the cross-sectional shape of a rectangular shape is an approximately quadrangular prism shape that has a rectangular shape in any plane perpendicular to the upper or lower surface of the substrate 1 and passing through the center of the through hole 12. Similarly, one example of an actual shape of the second through hole constituent part 122 thus having the cross-sectional shape of a rectangular shape is an approximately quadrangular prism shape that has a rectangular shape in any plane perpendicular to the upper or lower surface of the substrate 1 and passing through the center of the through hole 12.

As shown in FIG. 5, the through hole 12 in the infrared sensor according to the second embodiment is configured with a combination of the first through hole constituent part 121 having an opening on the upper surface of the substrate 1 and the second through hole constituent part 122 having a shape different from the first through hole constituent part 121. That is, both communicate with one another and the through hole 12 is formed. Note that, according to the second embodiment, both the first through hole constituent part 121 and the second through hole constituent part 122 have rectangular shapes, respectively, in the cross-sectional shapes. However, the sizes thereof are different, and thus, it can be said that the shapes thereof are different accordingly. Further, also in the second embodiment, the number of the second through hole constituent parts 122 is one. However, a plurality of the second through hole constituent parts may be included instead.

In the cross-sectional shape of the through hole 12 as that mentioned above, the inside wall of the second through hole constituent part 122 is placed outside the inside wall of the first through hole constituent part 121, as shown in FIG. 5.

In the case where the infrared sensor has such a configuration, the angle of field of the infrared sensor is determined by the inner ones of the straight lines connecting the lower end 15, 15' of the first through hole constituent part 121 with the infrared sensor part 10 and the straight lines connecting the lower end 16, 16' of the second through hole constituent part 122 with the infrared sensor part 10. In the case of FIG. 5, the straight lines connecting the lower end 15, 15' of the first through hole constituent part 121 with the infrared sensor part 10 are the inner ones. Therefore, the angle "E" between these straight lines "F" and "G" is the angle of field of the infrared sensor. Note that the lower end of the through hole constituent part not present on these straight lines "F" and "G" (in FIG. 5, the lower end 16, 16' of the second through hole constituent part 122) is placed outside of these straight lines "F" and "G".

By forming the through hole 12 to have the above-mentioned configuration, it is possible to increase the angle of field of the infrared sensor in comparison to the related art, and freely determine the angle of field of the infrared sensor by adjusting the shape and/or the height of the first or the second through hole constituent part, while maintaining the thickness of the substrate as a whole included in the infrared sensor.

As for the other configuration, it is possible that the infrared sensor according to the second embodiment has the same configuration as that of the infrared sensor according to the first embodiment described above, and thus, duplicate description will be omitted.

Next, a manufacturing method of the through hole 12 in the infrared sensor according to the second embodiment will be described using FIGS. 6A-6F.

Figure 6A:
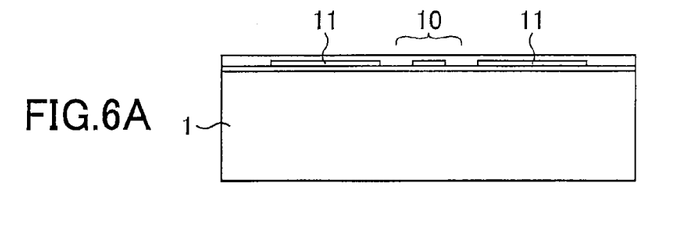
FIGS. 6A, 6B, 6C, 6D, 6E and 6F illustrate a manufacturing process of the infrared sensor according to the second embodiment.

FIG. 6A shows a state where, on the substrate 1, the infrared sensor part 10 and the peripheral circuit 11 are formed. For example, they can be formed by a semiconductor manufacturing process the same as or similar to any one of those for common IC, LSI and so forth.

Figure 6B:
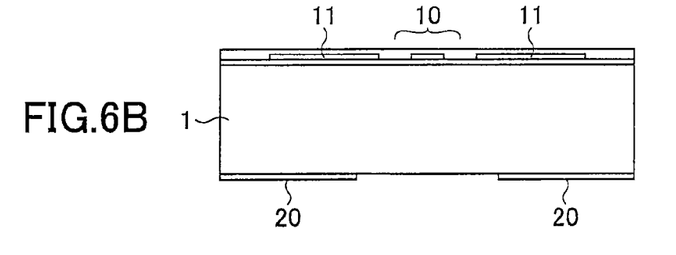

FIG. 6B shows a state where a mask 20 is formed for the purpose of forming the opening on the rear surface of the substrate 1. The material of the mask 20 is not particularly limited. For example, a material such as resist, photosensitive polyimide, a Si oxide film or a Si nitride film can be used. Note that in a case where the actual shape of the second through hole constituent part 122 is an approximately quadrangular prism shape as mentioned above, the shape of the opening formed in the mask 20 is an approximately quadrangular shape, accordingly.

Figure 6C:
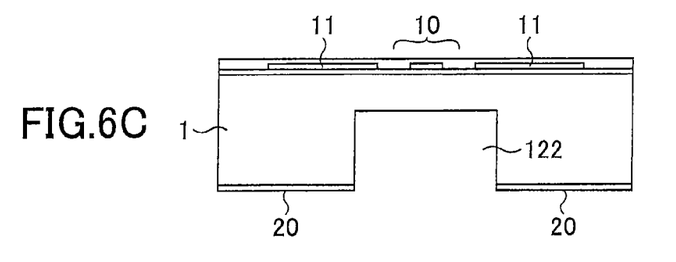

FIG. 6C shows a state where the second through hole constituent part 122 is formed using anisotropic etching. A specific method of the etching is not particularly limited. For example, ICP etching, RIE or the like can be used. As the etching gas, a gas such as a $SF_6$, $XeF_2$, or the like, can be used. In the case of using anisotropic etching, the cross-sectional shape of the second through hole constituent part 122 thus formed is a rectangular shape.

Figure 6D:
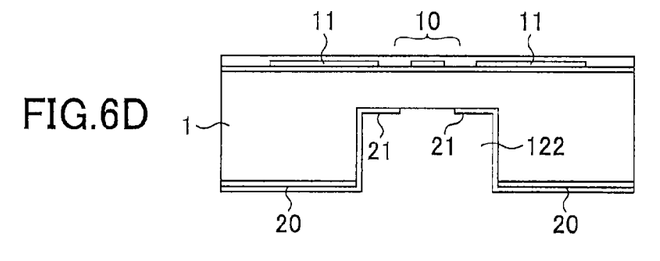

FIG. 6D shows a state where, for the purpose of further forming the first through hole constituent part 121 on the bottom of the second through hole constituent part 122, a mask 21 is formed. The mask 21 may be formed by double coating without removing the mask 20, or may be newly formed after first removing the mask 20. FIG. 6D shows the case of double coating. The mask material is not particularly limited. For example, a material such as resist, photosensitive polyimide, a Si oxide film or a Si nitride film can be used as the material of the mask 21. Note that, in order to carry out patterning on the bottom of the second through hole constituent part 122, it is preferable to form the mask 21 using an apparatus such as a spray coater by which it is easy to apply the mask material or the like to such an uneven part. Note that in a case where the actual shape of the first through hole constituent part 121 is an approximately quadrangular prism shape as mentioned above, the shape of the opening formed in the mask 21 is an approximately quadrangular shape, accordingly.

Figure 6E:
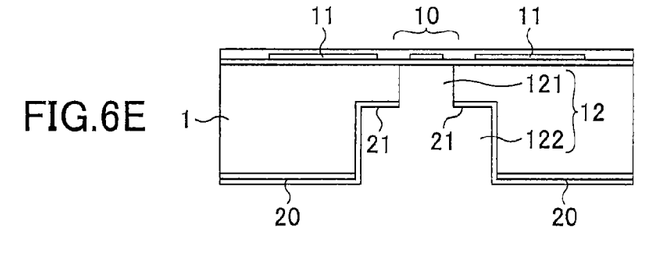

FIG. 6E shows a state where, by carrying out anisotropic etching, the first through hole constituent part 121 is formed. A specific method of the anisotropic etching is not particularly limited. For example, anisotropic etching such as ICP etching or RIE can be used. As the etching gas, a gas such as a $SF_6$, $XeF_2$, or the like, can be used.

Figure 6F:
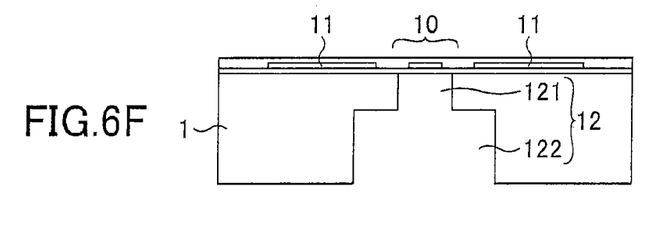

FIG. 6F shows a final shape after the masks 20 and 21 formed on the rear surface are removed. The size of the first through hole constituent part 121 is such that, as described above, the maximum diameter is determined by the size of the infrared sensor part 10. Therefore, the angle of field of the infrared sensor can be adjusted by determining the shape of the second through hole constituent part 122, that is, the depth and/or the position of the inside wall thereof, as described above using FIG. 5.

Further, as the cross-sectional shape of the second through hole constituent part 122, the rectangular shape is shown in FIGS. 6C-6F. However, the cross-sectional shape of the second through hole constituent part 122 can be a tapered shape or the like, instead. As long as the shapes of the respective through hole constituent parts 121 and 122 shown in FIG. 5 can be obtained, the cross-sectional shapes of the second through hole constituent part 122 is not limited to a rectangular shape.

[Third Embodiment]

In the third embodiment, another configuration example of an infrared sensor according to the present invention will be described.

Figure 7:
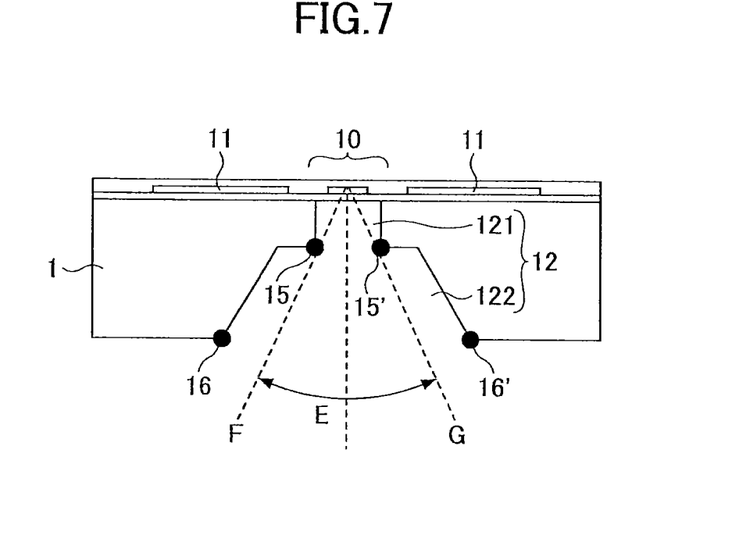
FIG. 7 illustrates an infrared sensor according to a third embodiment of the present invention.

In the infrared sensor according to the third embodiment, in a cross-sectional shape on a plane perpendicular to the upper surface of the substrate 1, at least one of the first through hole constituent part 121 and the second through hole constituent part 122 has a trapezoidal shape. Further, at least another one of the first through hole constituent part 121 and the second through hole constituent part 122 has a rectangular shape.

The specific configuration will now be described using FIG. 7.

FIG. 7 shows a sectional view taken along a plane perpendicular to the upper surface (lower surface) of the substrate 1 of the infrared sensor according to the third embodiment and passing through the through hole 12.

As shown in FIG. 7, the through hole 12 in the infrared sensor according to the third embodiment is configured by a combination of the first through hole constituent part 121 having an opening on the upper surface of the substrate 1 and the second through hole constituent part 122 having a shape different from the first through hole constituent part 121. That is, both communicate with one another and the through hole 12 is formed. Note that, according to the third embodiment, the first through hole constituent part 121 has a rectangular shape in the cross-sectional shape and the second through hole constituent part 122 has a trapezoidal shape in the cross-sectional shape. Also according to the third embodiment, the number of the second through hole constituent parts 122 is one. However, a plurality of the second through hole constituent parts may be included instead. Further, as long as, as mentioned above, at least one of the first through hole constituent part 121 and the second through hole constituent part 122 has a rectangular shape in the cross-sectional shape and at least another one of the first through hole constituent part 121 and the second through hole constituent part 122 has a trapezoidal shape in the cross-sectional shape, the shapes of the through hole constituent parts 121 and 122 are not limited to those shown in FIG. 7.

Note that one example of an actual shape of the first through hole constituent part 121 thus having the cross-sectional shape of a rectangular shape is an approximately quadrangular prism shape that has a rectangular shape in any plane perpendicular to the upper or lower surface of the substrate 1 and passing through the center of the through hole 12. Similarly, one example of an actual shape of the second through hole constituent part 122 thus having the cross-sectional shape of a trapezoidal shape is a shape of an approximately truncated quadrangular pyramid that has a trapezoidal shape in any plane perpendicular to the upper or lower surface of the substrate 1 and passing through the center of the through hole 12.

In the cross-sectional shape of the through hole 12 as that mentioned above, the inside wall of the second through hole constituent part 122 is placed outside the inside wall of the first through hole constituent part 121 as shown in FIG. 7.

In the case where the infrared sensor has such a configuration, the angle of field of the infrared sensor is determined by the inner ones of the straight lines connecting the lower end 15, 15' of the first through hole constituent part 121 with the infrared sensor part 10 and the straight lines connecting the lower end 16, 16' of the second through hole constituent part 122 with the infrared sensor part 10. In the case of FIG. 7, the straight lines connecting the lower end 15, 15' of the first through hole constituent part 121 with the infrared sensor part 10 are the inner ones. Therefore, the angle "E" between these straight lines "F" and "G" is the angle of field of the infrared sensor. Note that the lower end of the through hole constituent part not present on these straight lines "F" and "G" (in FIG. 7, the lower end 16, 16' of the second through hole constituent part 122) is placed outside these straight lines "F" and "G".

By forming the through hole 12 to have the above-mentioned configuration, it is possible to increase the angle of field of the infrared sensor in comparison to the related art, and freely determine the angle of field of the infrared sensor by adjusting the shape and/or the height of the first or the second through hole constituent part, while maintaining the thickness of the substrate 1 as a whole included in the infrared sensor.

As for the other configuration, it is possible that the infrared sensor according to the third embodiment has the same configuration as that of the infrared sensor according to the first embodiment described above, and thus, duplicate description will be omitted.

Next, a manufacturing method of the through hole 12 in the infrared sensor according to the third embodiment will be described using FIGS. 8A-8F.

Figure 8A:
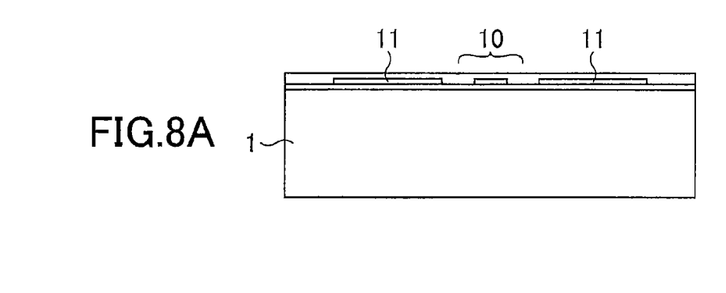
FIGS. 8A, 8B, 8C, 8D, 8E and 8F illustrate a manufacturing process of the infrared sensor according to the third embodiment.

FIG. 8A shows a state where, on the substrate 1, the infrared sensor part 10 and the peripheral circuit 11 are formed. For example, they can be formed by a semiconductor manufacturing process the same as or similar to any one of those for common IC, LSI and so forth.

Figure 8B:
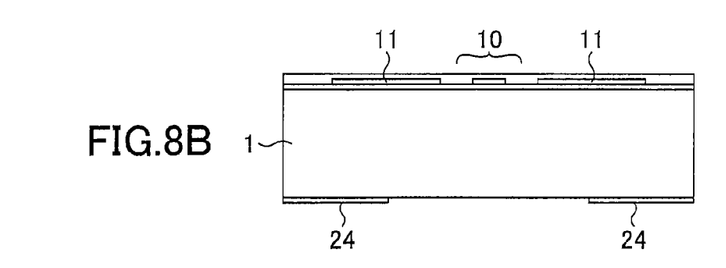

FIG. 8B shows a state where a mask 24 is formed for the purpose of forming the opening on the rear surface of the substrate 1. Here, the opening formed in the mask 24 is used for carrying out crystal anisotropic wet etching, and therefore, as the mask material, although it is not particularly limited, it is possible to use a material such as a resist having alkali resistance, a Si oxide film or a Si nitride film. Note that in a case where the actual shape of the second through hole constituent part 122 is a shape of an approximately truncated quadrangular pyramid as mentioned above, the shape of the opening formed in the mask 24 is an approximately quadrangular shape, accordingly.

Figure 8C:
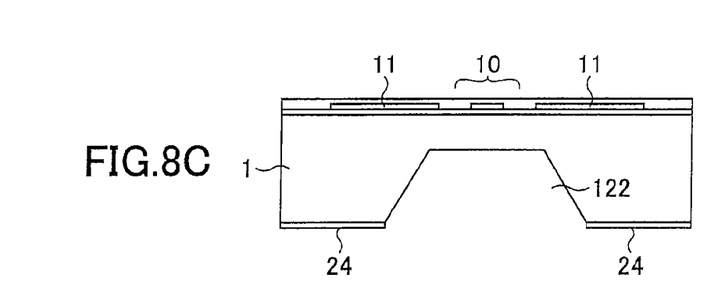

FIG. 8C shows a state where the second through hole constituent part 122 is formed using crystal anisotropic wet etching. As the etchant, although it is not particularly limited, it is possible to use an alkali solution such as KOH or TMAH. By using crystal anisotropic wet etching, it is possible that the cross sectional shape of the second through hole constituent part 122 thus formed is a trapezoidal shape.

Figure 8D:
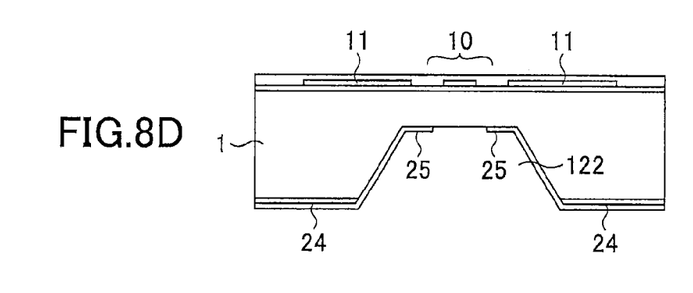

FIG. 8D shows a state where, for the purpose of further forming the first through hole constituent part 121 on the bottom of the second through hole constituent part 122, a mask 25 is formed. The mask 25 may be formed by double coating without removing the mask 24, or may be newly formed after first removing the mask 24. FIG. 8D shows the case of double coating. The mask material is not particularly limited. For example, a material such as resist, photosensitive polyimide, a Si oxide film or a Si nitride film can be used as the material of the mask 21. Note that in a case where the actual shape of the first through hole constituent part 121 is an approximately quadrangular prism shape as mentioned above, the shape of the opening formed in the mask 25 is an approximately quadrangular shape, accordingly.

Note that, in order to carry out patterning on the bottom of the second through hole constituent part 122, it is preferable to form the mask 25 using an apparatus such as a spray coater by which it is easy to apply the mask material or the like to such an uneven part.

Figure 8E:
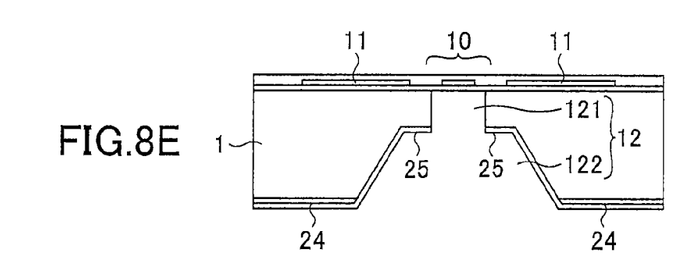

FIG. 8E shows a state where, by carrying out anisotropic etching, the first through hole constituent part 121 is formed. A specific method of the anisotropic etching is not particularly limited. For example, anisotropic etching such as ICP etching or RIE can be used. As the etching gas, a gas such as a $SF_6$, $XeF_2$, or the like, can be used.

Figure 8F:
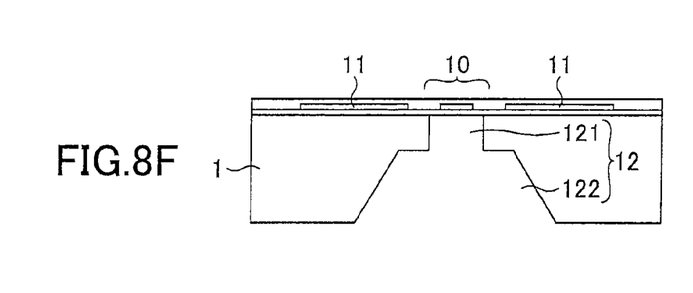

FIG. 8F shows a final shape after the masks 24 and 25 formed on the rear surface are removed. The size of the first through hole constituent part 121 is such that, as described above, the maximum diameter is determined by the size of the infrared sensor part 10. Therefore, the angle of field of the infrared sensor can be adjusted by determining the shape of the second through hole constituent part 122, that is, the depth and/or the position of the inside wall thereof, as described above using FIG. 7.

[Fourth Embodiment]

In the fourth embodiment, another configuration example of an infrared sensor according to the present invention will be described.

In the infrared sensor according to the fourth embodiment, the angle of field of the infrared sensor obtained in a cross-sectional shape of the through hole on a first plane perpendicular to the upper surface of the substrate is different from the angle of field of the infrared sensor obtained in a cross-sectional shape of the through hole on a plane perpendicular to the upper surface of the substrate and the first plane.

This point will be described now using FIG. 9 and FIGS. 10A and 10B.

Figure 9:
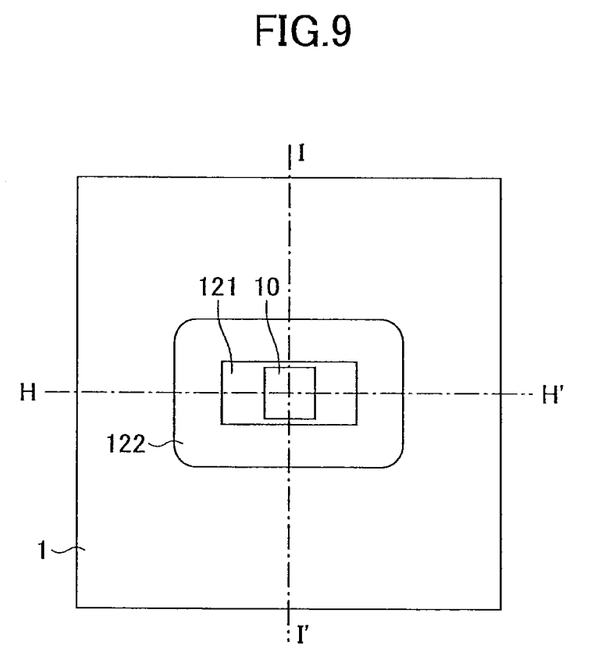
FIG. 9 illustrates a configuration of an infrared sensor according to a fourth embodiment of the present invention viewed from a rear side of a substrate.

FIG. 9 shows a view of the infrared sensor according to the fourth embodiment viewed from the rear surface side of the substrate 1. In other words, FIG. 9 shows a view of the infrared sensor according to the fourth embodiment viewed from the side of the substrate 1 of the infrared sensor. FIG. 10A shows a sectional view taken along an H-H' line in FIG. 9. FIG. 10B shows a sectional view taken along an I-I' line in FIG. 9.

In the infrared sensor according to the fourth embodiment, the angle of field of the infrared sensor on the H-H' line cross section that is a horizontal cross section in FIG. 9 is different from the angle of field of the infrared sensor on the I-I' line cross section that is a vertical cross section in FIG. 9.

Figure 10A:
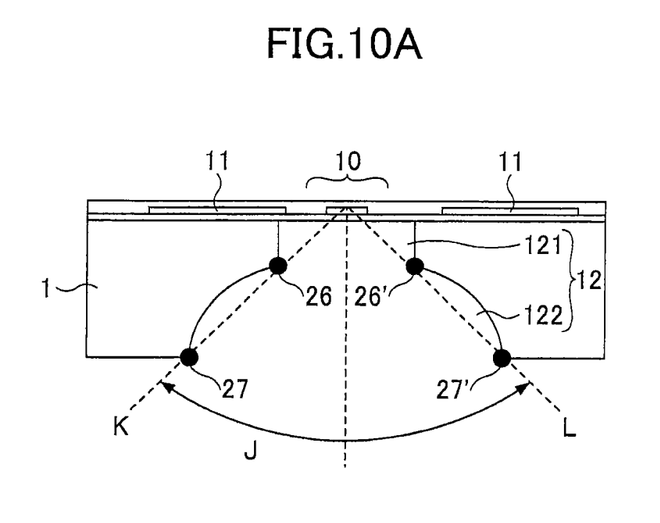
FIGS. 10A and 10B are sectional views of the infrared sensor according to the fourth embodiment.
Figure 10B:
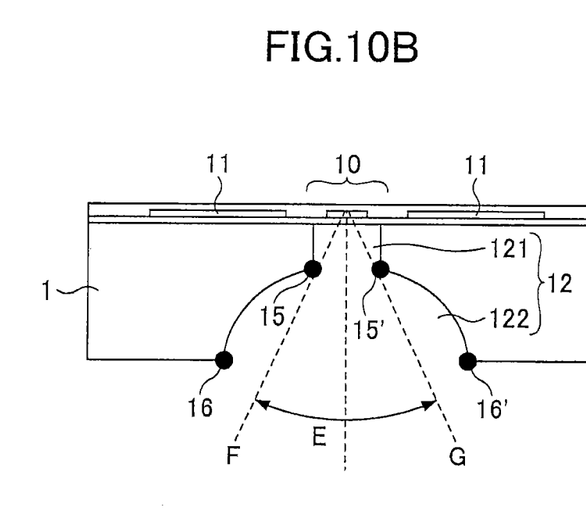

First, also in the infrared sensor according to the fourth embodiment, the through hole 12 is configured by a combination of the first through hole constituent part 121 and the second through hole constituent part 122, as shown in FIGS. 10A and 10B. That is, the plurality of through hole constituent parts communicate with one another and the through hole 12 is formed.

At this time, as shown in FIGS. 10A and 10B, on the first plane perpendicular to the upper surface of the substrate 1 (for example, in the H-H' line sectional view) and on the plane perpendicular to the upper surface of the substrate 1 and the first plane (for example, in the I-I' line sectional view), the inside wall of the second through hole constituent part 122 is placed outside the inside wall of the first through hole constituent part 121. Further, the configuration is such that, in the H-H' line sectional view and the I-I' line sectional view, the shapes of the through hole constituent parts 121 and 122 are different therebetween. Therefore, as described later, the angles of field of the infrared sensor are different between the horizontal direction (for example, the direction of the H-H' line section) and the vertical direction (for example, the direction of the I-I' line section).

Then, as shown in FIG. 10A, "J" denotes the angle of field of the infrared sensor on the H-H' section. At least one of the lower end 26, 26' of the first through hole constituent part 121 and the lower end 27, 27' of the second through hole constituent part 122, that determines the angle of field "J", is present on the straight lines "K" and "L". The shape of the second through hole constituent part 122 is adjusted so that any lower end(s), not present on the straight lines "K" and "L", is(are) placed outside the angle of field "J". Note that in FIG. 10A, both the lower ends 26, 26' and 27, 27' are present on the straight lines "K" and "L", as shown.

Similarly, as shown in FIG. 10B, "E" denotes the angle of field of the infrared sensor on the I-I' section. At least one of the lower end 15, 15' of the first through hole constituent part 121 and the lower end 16, 16' of the second through hole constituent part 122, that determines the angle of field "J", is present on the straight lines "F" and "G". The shape of the second through hole constituent part 122 is adjusted so that any lower end(s), not present on the straight lines "F" and "G", is(are) placed outside the angle of field "E". Note that in FIG. 10B, the lower ends 15, 15' is present on the straight lines "F" and "G", and the lower ends 16, 16' is not present on the straight lines "F" and "G", as shown. Therefore, in this case, the shape of the second through hole constituent part 122 is adjusted so that the lower end 16, 16' is placed outside the angle of field "E".

Further, in the infrared sensor according to the fourth embodiment, the configuration is provided such that, as can be seen from FIGS. 10A and 10B, the angle of field of the infrared sensor in the H-H' line sectional view corresponding to the horizontal direction in FIG. 9 is different from the angle of field of the infrared sensor in the I-I' line sectional view corresponding to the vertical direction in FIG. 9.

In this configuration, it is possible to form an infrared sensor having different angles of field between the horizontal direction and the vertical direction. Further, the fourth embodiment is particularly advantageous for a case where a lens having different angles of field (field angles) between a horizontal direction and a vertical direction and an infrared sensor are used in combination.

Note that, in the fourth embodiment, description has been made using a mode described above in the first embodiment combining a first through hole constituent part having a rectangular shape in a cross-sectional shape and a second through hole constituent part having a curved surface shape in the cross-sectional shape. However, the fourth embodiment is not limited to such a mode. Also in each of the respective modes described above in the second and third embodiments, it is possible to provide an infrared sensor having different angles of field in a horizontal direction and a vertical direction by adjusting the shape of a through hole constituent part(s), in the same way.

As for a manufacturing method of the infrared sensor according to the fourth embodiment, it is possible to use a manufacturing method the same as or similar to any of those described above in the first, second and third embodiments. Thus, duplicate description is omitted.

[Fifth Embodiment]

In the fifth embodiment, another configuration example of an infrared sensor according to the present invention will be described.

In the infrared sensor according to the fifth embodiment, an infrared condensing lens is further provided on the side of the lower surface of the substrate in the infrared sensor according to any of the first, second, third and fourth embodiments described above. Further, the incident path of infrared rays incident through the periphery of the effective diameter of the infrared condensing lens to the infrared sensor falls within the range of the angle of field of the infrared sensor.

First, a problem in an infrared sensor in the related art having an infrared condensing lens will be described.

Figure 11:
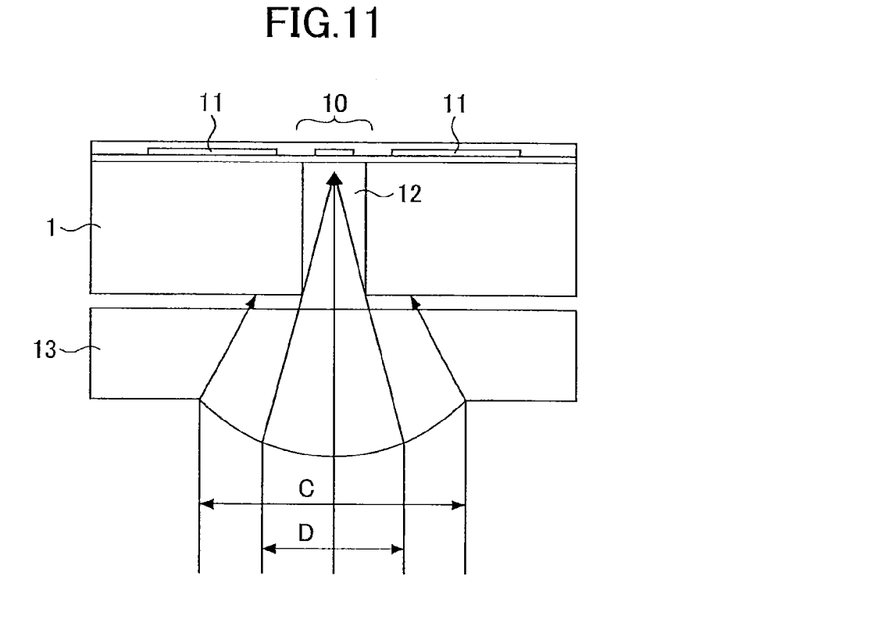
FIG. 11 illustrates a configuration of an infrared sensor in the related art.

FIG. 11 shows an infrared sensor in the related art having an infrared condensing lens.

In FIG. 11, such a configuration is shown that an infrared condensing lens 13 is placed on the side of the lower surface of the substrate in the infrared sensor shown in FIG. 2.

In such an infrared sensor in the related art, the width of the through hole 12 is restricted, and the angle of field of the infrared sensor is narrow, as mentioned above. Therefore, also in the case of placing the infrared condensing lens 13, some of infrared rays incident on the infrared sensor from the infrared condensing lens 13, that are incident on the infrared sensor from the outside of the through hole 12, are blocked by the substrate 1, and thus, cannot reach the infrared sensor part 10. Therefore, as shown in FIG. 11, with respect to the effective diameter C of the infrared condensing lens 13, only the effective diameter D determined by the angle of field of the infrared sensor can be substantially used. Thus, loss in the infrared light quantity may be large. Furthermore, in such a configuration of the infrared sensor and the infrared condensing lens, it is necessary to use the substrate 1 as a standard for obtaining accuracy in the distance and the slope between the infrared sensor part 10 and the infrared condensing lens 13. Therefore, it may be difficult to change the thickness of the substrate 1 so as to change the aspect ratio of the through hole 12 in order to increase the angle of field of the infrared sensor.

Figure 12:
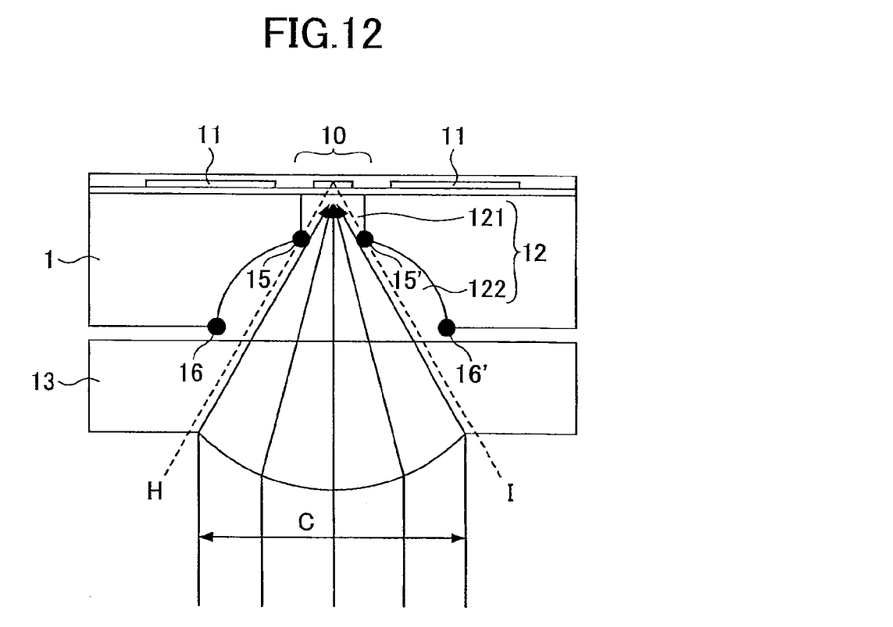
FIG. 12 illustrates an infrared sensor according to a fifth embodiment of the present invention.

Next, FIG. 12 shows the infrared sensor according to the fifth embodiment.

FIG. 12 is a sectional view of a substrate 1 included in the in infrared sensor according to the fifth embodiment taken along a plane perpendicular to the upper surface (lower surface) of the substrate 1 and passing through a through hole 12.

As shown in FIG. 12, the infrared sensor according to the fifth embodiment has an infrared condensing lens 13 at a side of the lower surface of the substrate 1. "C" denotes the range of the effective diameter of the infrared condensing lens 13. In order to effectively utilize the effective diameter "C", the angle of field of the infrared sensor is selected in accordance with the characteristics of the lens 13.

In FIG. 12, the angle of field of the infrared sensor is determined so that the substrate 1 is not to be placed on the incident path of the infrared rays incident through the end (periphery) of the effective diameter C of the infrared condensing lens 13, that is, the incident path of the infrared rays is not to be blocked by the substrate 1.

As described above in the first, second, third and fourth embodiments, the angle of field of the infrared sensor is determined by the inner straight lines of those connecting the lower end 15, 15' of the first through hole constituent part 121 of the through hole 12 with the infrared sensor part 10 and those connecting the lower end 16, 16' of the second through hole constituent part 122 of the through hole 12 with the infrared sensor part 10. In the case of FIG. 12, the straight lines "H" and "I" connecting the lower end 15, 15' of the first through hole constituent part 121 and the infrared sensor part 10 are the inner ones. Therefore, the angle between the straight lines "H" and "I" is the angle of field of the infrared sensor. The lower end 16, 16' of the second through hole constituent part 122 not present on these straight lines "H" and "I" is present outside these straight lines "H" and "I" accordingly. According to the fifth embodiment, within the range of the angle of field of the infrared sensor, the incident path from the infrared condensing lens 13 is placed. That is, the incident path of the infrared rays incident on the infrared sensor through the periphery of the effective diameter "C" of the infrared condensing lens 13 is placed within the range of the angle of field of the infrared sensor.

According to the infrared sensor in the fifth embodiment, the incident path of infrared rays incident within the effective diameter "C" of the infrared condensing lens 13 attached to the infrared sensor falls within the range of the angle of field of the infrared sensor, and the infrared rays are incident on the infrared sensor part 10 without being blocked by the substrate 1. Therefore, it is possible to sufficiently utilize the intrinsic performance of the lens 13 attached to the infrared sensor.

Note that the description has been made using a mode described above in the first embodiment combining a through hole constituent part having a rectangular shape in a cross-sectional shape and a second through hole constituent part having a curved surface shape in the cross-sectional shape. However, the fifth embodiment is not limited to such a mode. Also in each of the respective modes described above in the second, third and fourth embodiments, it is possible to place an infrared condensing lens and select the angle of field of an infrared sensor, and thus, obtain an infrared sensor similar to that according to the fifth embodiment.

The infrared sensors have been described in the embodiments. However, the present invention is not limited to the specifically disclosed embodiments, and variations and modifications may be made without departing from the scope of the present invention.

The present application is based on and claims the benefit of priority of Japanese Priority Application No. 2013-049223 filed on Mar. 12, 2013, the entire contents of which are hereby incorporated herein by reference.

What is claimed is:

1. An infrared sensor of a rear surface irradiation type comprising:
   a substrate in which a through hole is formed that passes through between an upper surface and a lower surface of the substrate;
   an infrared absorption part formed at a side of the upper surface of the substrate, and is separate from the substrate by the through hole; and
   a temperature sensor part that detects a change in a temperature of the infrared absorption part, wherein
   the through hole includes a first through hole constituent part having an opening on the upper surface of the substrate, and one or more second through hole constituent parts having shapes different from the first through hole constituent part, the first through hole constituent part and the one or more second through hole constituent parts communicating with each other, and
   in a cross-sectional shape of the through hole on a plane perpendicular to the upper surface of the substrate, inside walls of the one or more second through hole constituent parts are placed outside an inside wall of the first through hole constituent part.

2. The infrared sensor as claimed in claim 1, wherein
   in a cross-sectional shape of the first through hole constituent part and the one or more second through hole constituent parts on a plane perpendicular to the upper surface of the substrate,
   the first through hole constituent part or one or more second through hole constituent parts has a curved surface shape, and
   the one of the first through hole constituent part and the one or more second through hole constituent parts that does not have the curved surface shape has a rectangular shape.

3. The infrared sensor as claimed in claim 1, wherein
   in a cross-sectional shape of the first through hole constituent part and the one or more second through hole constituent parts on a plane perpendicular to the upper surface of the substrate,
   the first through hole constituent part and the one or more second through hole constituent parts have rectangular shapes.

4. The infrared sensor as claimed in claim 1, wherein
   in a cross-sectional shape of the first through hole constituent part and the one or more second through hole constituent parts on a plane perpendicular to the upper surface of the substrate,
   the first through hole constituent part or one or more second through hole constituent parts has a trapezoidal shape, and
   the one of the first through hole constituent part and the one or more second through hole constituent parts that does not have the trapezoidal shape has a rectangular shape.

5. The infrared sensor as claimed in claim 1, wherein
   an angle of field obtained in a cross-sectional shape of the through hole on one plane perpendicular to the upper surface of the substrate is different from
   an angle of field obtained in a cross-sectional shape of the through hole on a plane perpendicular to the upper surface of the substrate and the one plane.

6. The infrared sensor as claimed in claim 1, further comprising an infrared condensing lens at a side of the lower surface of the substrate, wherein
   an incident path of infrared rays incident through a periphery of an effective diameter of the infrared condensing lens to the infrared sensor falls within a range of an angle of field of the infrared sensor.

* * * * *